United States Patent [19]

Maffet

[11] 4,160,732
[45] Jul. 10, 1979

[54] MECHANICAL DEWATERING PROCESS

[75] Inventor: Vere Maffet, West Chester, Pa.

[73] Assignee: UOP Inc., Des Plaines, Ill.

[21] Appl. No.: 891,437

[22] Filed: Mar. 29, 1978

Related U.S. Application Data

[63] Continuation-in-part of Ser. No. 813,577, Jul. 7, 1977, Pat. No. 4,098,006, which is a continuation-in-part of Ser. No. 775,673, Mar. 8, 1977, Pat. No. 4,128,946.

[51] Int. Cl.² ............................................. B01D 37/02
[52] U.S. Cl. ...................................... 210/75; 100/37; 100/117
[58] Field of Search ..................... 100/117, 145–150; 210/75, 402, 193, 194

[56] References Cited

U.S. PATENT DOCUMENTS

| 1,151,186 | 8/1915 | Johnson | 100/147 X |
| 1,772,262 | 8/1930 | Naugle | 100/148 X |
| 3,997,441 | 12/1976 | Pamplin, Jr. | 210/75 |

Primary Examiner—Peter Feldman
Attorney, Agent, or Firm—James R. Hoatson, Jr.; John F. Spears, Jr.; William H. Page, II

[57] ABSTRACT

A process for mechanically dewatering fibrous organic waste such as sewage sludge. The underwatered waste is passed into the first end of a cylindrical dewatering zone having a porous outer wall. A helical blade rotated within the dewatering zone pressurizes the waste and moves it to the outlet at the second end of the dewatering zone. A filter media comprising a cylindrical substantially unagitated layer of fibrous material derived from the waste is retained within an annular space located between the outer edge of the helical blade and the inner surface of the porous wall.

13 Claims, 2 Drawing Figures

MECHANICAL DEWATERING PROCESS

CROSS-REFERENCE TO RELATED APPLICATIONS

This application is a Continuation-In-Part of my prior copending application Ser. No. 813,577 filed July 7, 1977, now Pat. No. 4,098,006 and which was a Continuation-In-Part of my prior copending application Ser. No. 775,673 filed on March 8, 1977, now Pat. No. 4,128,946. The teaching of my prior applications is incorporated herein by reference.

FIELD OF THE INVENTION

The invention relates to a process for dewatering fibrous organic waste such as sewage sludge or wood pulp scraps. The invention more specifically relates to a process for mechanically dewatering sewage sludge wherein the undewatered feed stream is passed into a cylindrical mechanical dewatering zone having a porous cylindrical sidewall and therein pressurized by a rotating helical blade. The invention is directly concerned with a dewatering process using a press wherein the liquid removed from the feed stream drains through a pressure surface comprising a layer of fibers collected from the feed stream.

PRIOR ART

It has long been recognized that it would be advantageous to mechanically remove water from various waste and by-product sludges such as sewage sludge. In the specific case of sewage sludge, mechanical dewatering would reduce the amount of material to be disposed or transported, or the amount of water to be evaporated during various drying steps, as in the production of solid fertilizers or soil conditioners. Many different types of dewatering apparatus have been developed, but none is believed to have gained widespread usage and acceptance. Both the difficulties encountered in mechanically dewatering sewage sludge and a process for compacting the dried sludge into fertilizer pellets are described in U.S. Pat. No. 2,977,214 (Cl. 71-64).

One specific type of mechanical dewatering apparatus is a continuous filter belt which is slowly pulled through solids collection and removel areas. The device presented in U.S. Pat. No. 2,097,529 (Cl. 210-396) is of this type and may be used to dewater sewage sludge. Other sludge dewatering machines utilizing a moving filter belt are shown in U.S. Pat. Nos. 4,008,158 (Cl. 210-386) and 4,019,431 (Cl. 100-37). A belt or conveyor type sewage sludge dewatering device is also shown in U.S. Pat. No. 3,984,329 (Cl. 210-396). This reference is pertinent for its teaching of the benefits obtained by breaking up the layer of solid matter which forms on the perforate conveyor belt. These benefits include aiding the water in reaching the belt and a tendency to prevent the plugging of the openings in the belt.

U.S. Pat. Nos. 3,695,173 (Cl. 100-74); 3,938,434 (Cl. 100-117) and 4,041,854 (Cl. 100-112), all to C. H. Cox, are pertinent for their presentation of apparatus for dewatering sewage sludge in which a helical screw conveyor is rotated within a cylindrical and frusto-conical dewatering chamber having perforate walls. These references all describe apparatus in which the outer edge of the screw conveyor scrapes the inner surface of perforate wall. The inventions presented include specific coil-spring wiping blades, slot-cleaning blades or brushes attached to the outer edge of the helical blade for continuous contact with the inside surface of the perforate wall, thereby cleaning solids therefrom. The two latest patents in this group are also relevant for their teaching of an alternative embodiment in which the terminal cylindrical portion of the screw conveyor blade does not follow closely the inner surface of the perforate wall but instead has a diameter approximately one-half the diameter of the dewatered solids output opening.

The subject process is distinguishable by several points including the definite annular space provided between the outer edge of the screw conveyor blade and the inner surface of the perforate outer wall. This space begins at the first end of the screw conveyor, where the feed first contacts the conveyor, and continues for the entire length of the porous wall to the outlet of the apparatus. Smaller spacing between the parallel windings of the perforated outer wall also distinguishes the inventive concept.

BRIEF SUMMARY OF THE INVENTION

The invention provides a simple, economical and efficient process for effecting the mechanical dewatering of organic waste which is capable of producing sewage sludge effluent streams containing over 50 wt.% solids. One embodiment of the invention may be broadly characterized as a dewatering process which comprises the steps of passing a feed stream comprising organic waste and which comprises at least 50 wt.% water and more than 5 wt.% fibers into the first end of a dewatering zone comprising a uniformly cylindrical chamber having a cylindrical porous wall formed by parallel windings spaced about 0.0075 to about 0.013 cm. apart; pressurizing the feed stream to a superatmospheric pressure by rotating a centrally mounted screw conveyor which extends between the first end and a second end of the dewatering zone while constricting the opening at the second end of the dewatering zone, with the blade of the screw conveyor having a uniformly helical outer edge which is separated from the inner surface of the porous wall by a distance of from about 0.08 to 5.0 cm.; maintaining a substantially continuous and unagitated cylindrical layer of filter media comprising fibers derived from the feed stream in an annular space located between the inner surface of the porous wall and the outer edge of the screw conveyor while simultaneously transferring organic waste through the center of the dewatering zone from the first end to the second end of the dewatering zone; withdrawing water radially from the dewatering zone through the porous wall and the cylindrical layer of filter media; and withdrawing a dewatering zone effluent stream having a higher organic waste solids content than the feed stream from the second end of the dewatering zone.

DESCRIPTION OF THE DRAWING

Referring now to FIG. 1, raw sewage sludge or other organic waste to be dewatered enters the apparatus through an inlet throat 1 and is directed downward to the first end of a dewatering zone where it makes contact with a screw conveyor having a helical blade 4.

Figure 1:
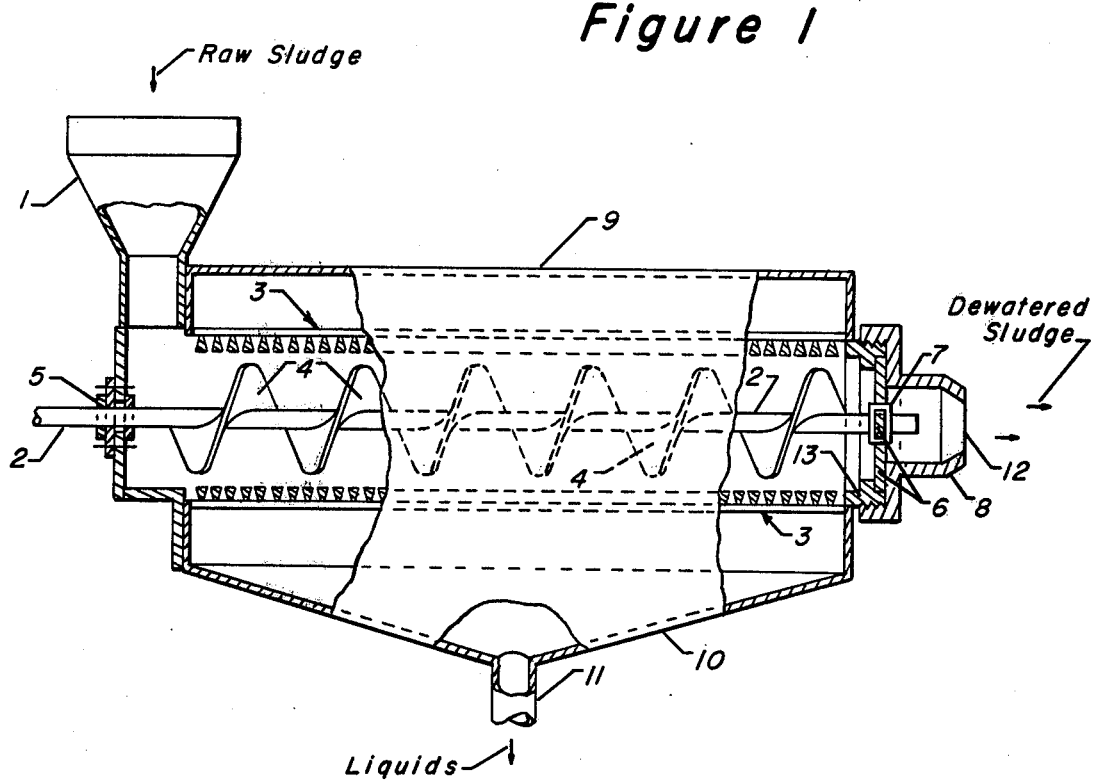
FIG. 1 is a cross-sectional view along a vertical plane of an apparatus which may be used to perform the subject process.

The shaft 2 of the screw conveyor extends out of the cylindrical chamber surrounding the dewatering zone through a seal and bearing 5 and is connected to a drive means not shown which rotates the screw conveyor. The rotation of the screw conveyor pressurizes the organic waste by pushing it toward the second end of the dewatering zone and against the cylindrical porous wall 3 which encircles the screw conveyor. The outer end of the conveyor is supported by a bearing 7 at the center of a spider or cross-member 6. The spider is in turn held in place by a threaded cap 8 having an opening 12 at the second end of the dewatering zone. The outer end of the arms of the spider are retained between a raised lip 13 on the inner surface of the chamber and the cap.

Fibrous material from the entering feed stream accumulates in an annular space between the outer edge of the screw conveyor and the inner surface of the porous wall. Water is expressed radially through this built-up layer of fiber and through the porous wall. The water is directed into a basin 10 by a shroud 9 which surrounds the upper portions of the porous wall and is then drawn off through line 11.

Figure 2:
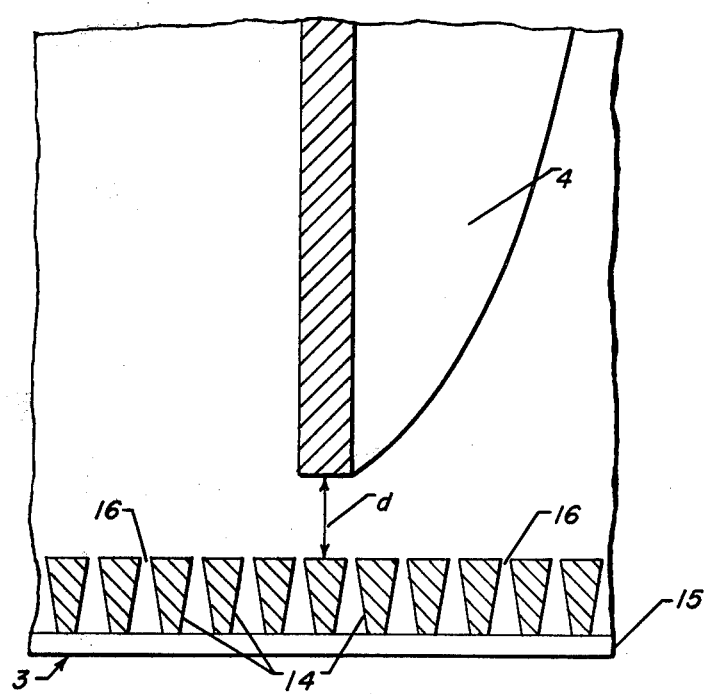
FIG. 2 is an enlarged cross-sectional view of a small portion of the screw conveyor blade and porous wall shown in FIG. 1.

The preferred construction of the cylindrical porous wall 3 is shown in detail in FIG. 2. The wall is formed by parallel spiral windings of tapered wire 14 which are welded to several connecting rods 15 at the smaller outer edge of each winding. The connecting rods are in alignment with the central axis of the cylinder formed by the wall. The broader edge of each winding faces inward toward the blade 4 of the screw conveyor, with each winding being separated by a uniform space 16 through which water may pass. The inner surface of the porous wall is separated from the outer edge of the helical blade by preferably constant distance "d".

These drawings are presented to ensure a clear understanding of the inventive concept and are not intended to limit the scope of the invention, which may also be practiced with apparatus differing from that shown here.

DETAILED DESCRIPTION

Large amounts of organic waste are generated daily from many sources. As used herein, the term "organic waste" is intended to include carbon-containing substances which are derived directly or indirectly from living or formerly living organisms. Specific examples include sewage sludge, fat, meat scraps, bone meal, leather scraps, hair, manure from animal sources, beet pulp, fruit pumice, vegetable and fruit peels and pieces, canning plant waste, eggs and egg shells, straw and animal bedding, bagasse, fermentation and distillation residues from vegetable sources, protein or sugar production plant effluents, kelp, wood chips, wood pulp, paper mill scraps and effluents and pharmaceutical wastes. The organic waste feed stream preferably comprises a sewage sludge produced in a municipal sewage treatment plant. It may be primary, secondary, or tertiary sludge which is digested or undigested. Preferably, the feed stream to the process contains about 15-25 wt.% or more solids and 5 wt.% fibers on a dry basis. That is, the organic waste feed stream will preferably contain about 15-25 wt.% solids before it is dewatered or fed to the process and should contain more than 5 wt.% fibers or fibrous material on a dry basis. The organic waste feed stream may, however, contain as little as 0.4 wt.% solids or as much as 60 wt.% solids in the specific case of sewage sludge. A typical undewatered sewage sludge will contain at least 50 wt.% water and a large amount of inorganic ash. Other components of sewage sludge include various soluble salts and minerals, water-soluble hydrocarbonaceous compounds, hydrocarbons, and cellulosic fibers, as from paper products and vegetable roughage. There is no apparent upper limit on acceptable fiber contents.

It is often desirable to remove some or most of the water present in an organic waste before it is consumed or disposed of. For instance, drying sewage sludge produces a solid material which may be formed into a very satisfactory fertilizer and soil builder. The dry form of the sludge is preferred since it is lighter for the same solids content, is less odoriferous, is easily stored in bags, and is easily applied using common types of dry fertilizer spreaders. It may be desirable to dewater other organic wastes to limit liquid run-off, to reduce disposal problems, to reduce the weight of wastes to be transported, to recover water for reuse, or to prepare the wastes for further processing. The inventive concept is therefore utilitarian in many different applications.

Water can normally be driven off organic wastes by the application of heat. However, this procedure normally requires the consumption of increasingly expensive fuel and leads to its own problems, including flue gas and vapor stream discharges. It is therefore desirable to mechanically dewater organic waste to the maximum extent possible and feasible and utilize thermal drying only as a final drying or sterilization step.

Despite the incentive provided by the benefits to be obtained by mechanical dewatering, the various continuous belt filtration devices have apparently not evolved to the point where they produce dewatered sewage sludges containing more than about 25-30 wt.% solids. This limitation also seems to apply to the extrusion press apparatus described in the previously referred to Cox U.S. Pat. No. 3,695,173 since it is specified as having produced sludge filtrates containing 66 and 71 percent moisture. It therefore appears that the prior art has not provided a method of mechanically dewatering sewage sludge which produces an effluent stream approaching or exceeding a 40 wt.% solids content.

It is an objective of this invention to provide a process for mechanically dewatering organic waste. It is another objective of this invention to provide a simple and effective process for the dewatering of sewage sludge. Yet another objective of the invention is to provide a process to mechanically dewater sewage sludge to a solids content greater than 60 wt.%, and preferably in excess of 75 wt.%.

The process is carried out in a dewatering zone comprising a porous cylindrical chamber having a first end which is sealed except for an organic waste inlet conduit and an opening for a rotating drive shaft and a second end having an opening for the discharge of the dewatered organic waste. The terminal portions of the chamber located adjacent to the central porous section of the chamber are preferably imperforate to provide greater structural strength. The chamber should have a length to inside diameter ratio above 2:1 and preferably from about 4:1 to about 20:1. The inside diameter of this chamber is preferably uniform along the length of the chamber. The cylindrical chamber of the subject dewatering zone corresponds to the barrel of a typical extruder. A major portion of the distance between the ends of the chamber is devoted to providing a porous outer wall through which water is expressed. This porous wall is to be cylindrical and preferably has the same inside diameter as the rest of the chamber, with the exception that a raised lip may be present at the second end of the chamber to aid in positioning equipment located at the end of the chamber.

The porous wall is preferably fashioned from a continuous length of wedge-shaped bar which is welded to several connecting members running along the length of the porous wall as shown in the drawing. This construction provides a continuous spiral opening having a self-cleaning shape. That is, the smallest opening between two adjacent parallel windings is at the inner surface of the porous wall, thereby providing a continuously widening space which allows any particle passing through the opening to continue outward. The outward movement of these particles is aided by the radially flowing water. Wedge-shaped wound screens of the desired shape are available commercially and are used as well screens and to confine particulate material within hydrocarbon conversion reactors. Other types of porous wall construction meeting the criteria set out herein may also be used.

The distance between adjacent windings, or the equivalent structure of other screen materials, used in the porous wall should be within the range of from about 0.0075 to about 0.013 cm. (or about 0.003 to 0.005 inches). This distance is smaller than that specified in the previously referred to Cox United States Patents, which is 0.006 inches in U.S. Pat. No. 3,695,173 and 0.008 inches in U.S. Pat. No. 3,938,434. The subject process is therefore performed in an apparatus having a considerably smaller opening than called for by the prior art.

A screw conveyor having a helical blade is centrally mounted within the cylindrical chamber. The major central axis of this conveyor is preferably coextensive with the major axis of the cylindrical chamber and the porous cylindrical wall. The chamber and porous wall are therefore concentric about the screw conveyor. It is critical to the proper performance of the process that the outer edge of the blade of the screw conveyor be spaced apart from the inner surface of the porous wall by a distance greater than about 0.08 cm. but less than about 5.0 cm. Preferably, the outer edge of the screw conveyor is at least 0.2 cm. but less than 2.0 cm. from the inner surface of the porous wall. It is especially preferred that a minimum distance of 0.44 cm. is provided between the outer edge of the screw conveyor and the porous wall. This distance should be substantially uniform along the distance the two elements are in juxtaposition.

The purpose of this separation between the screw conveyor and the wall is to provide a relatively unagitated layer of fibrous filter media on the inner surface of the porous wall. This filter media has an annular shape conforming to the inner surface of the porous wall and the cylinder swept by the outer edge of the screw conveyor. The term "unagitated" is intended to indicate that this filter bed is not mixed or sliced by any mechanical element extending toward the porous wall from the blade. This arrangement is contrasted to the previously referred to extrusion press apparatus in which the surface of the porous wall is "scraped" by the screw conveyor and blades or brushes are attached to the blade to clean the openings in the porous wall.

Although it is free of mechanical agitation, the annular layer of filter media covering the inner surface of the dewatering zone will not be stagnant and undisturbed since it will be subjected to the stress and abrasion which result from the rotation of the screw conveyor. The associated shear stress will extend radially outward through the filter bed to the porous wall, thereby exerting a torque on the entire bed and causing some admixture of the filter media. This torque may actually cause the annular layer of filter media to rotate with the screw conveyor. The speed of rotation and linear velocity of the filter bed toward the second end of the cylindrical chamber will probably at all times be less than that of organic waste solids located in the grooves of the screw conveyor. It is theorized that the filter media may be self-cleaning because of the continuous movement occurring along both of its surfaces. This action may explain the superior performance of the subject invention as compared to conventional processes in which the interface between a filter belt and accumulated material is essentially static.

The subject process is operated in a manner contrary to the teaching of the prior art in several areas. For instance, the prior art describes the problem of the porous wall or filter belt becoming clogged and teaches that the built-up layer of solids should be agitated or scraped from the porous wall. The subject process utilizes a wall having smaller openings which would seem to be more easily clogged. It also requires an unagitated layer of built-up fibers to cover the entire porous wall.

The necessary space between the edge of the screw conveyor and the inner surface of the porous wall may also be characterized by the ratio of the outer diameter of the screw conveyor to the inner diameter of the porous wall. This ratio should be between about 0.95:1 to about 0.8:1 when the inner diameter of the porous wall is between 5 cm. and 25 cm. The distances specifically set out above must be maintained at all times and are to govern in any case of conflict between these two methods of characterizing the invention.

The screw conveyor is rotated to move the organic waste to the outlet of the dewatering zone, pressurizing the material within the dewatering zone and thereby causing water to flow radially through the layer of filter media and the porous wall. The screw conveyor may be rotated at from about 10 to about 150 rpm, or even more rapidly if desired. However, it is preferred to operate the dewatering zone with the screw conveyor rotating at from 20 to 60 rpm. Only a moderate superatmospheric pressure is required within the dewatering zone. A pressure of less than 500 psig. is sufficient, with the pressure preferably being less than 100 psig. The process may be operated at ambient temperatures, with temperatures below 32° C. being preferred. It is therefore not necessary to provide either heating or cooling elements along the length of the dewatering zone.

The screw conveyor should have a length to diameter ratio above 2:1 and preferably in the range of from 4:1 to about 20:1. A unitary one-piece screw conveyor is preferred. The design of the screw conveyor is subject to much variation. The pitch or helix angle of the blade need not change along the length of the screw conveyor. However, constant pitch is not critical to successful performance of the process, and the pitch may be varied if so desired. Another common variable is the compression ratio of the screw conveyor or auger. The compression ratio refers to the change in the flight depth along the length of the screw conveyor, with the flight depth being measured from the surface of the shaft of the screw conveyor to the outer edge of the helical blade. As used herein, a 10:1 compression ratio is intended to specify that the flight depth at the terminal portion of the screw conveyor is one-tenth as great as the flight depth at the initial or feed receiving portion of the screw conveyor. The compression ratio of the screw conveyor is preferably below 15:1 and more preferably is in the range of from 1:1 to 10:1. Suitable screw conveyors, drive components and reduction gears are readily available from firms supplying these items for use in the extrusion of plastics, etc.

The preferred embodiment of the invention may be characterized as a process for dewatering fibrous organic waste which comprises the steps of passing a feed stream comprising organic waste and which comprises 50 wt.% water and at least 5 wt.% fibers on a dry basis into a first end of a dewatering zone comprising a cylindrical chamber having a cylindrical porous wall formed by parallel windings which are spaced apart by a distance of about 0.0075 to about 0.013 cm.; pressurizing the feed stream within the dewatering zone to a pressure less than 100 psig. but greater than that present at the outer surface of the cylindrical porous wall by rotating a screw conveyor having a helical blade which begins at the first end of the dewatering zone and which is centrally mounted within the cylindrical chamber while constricting the opening available at a second end of the dewatering zone to less than the available cross-sectional area of the cylindrical chamber, the blade of the screw conveyor having a helical outer edge which is separated from the inner surface of the porous wall by a distance of from about 0.2 to 2.0 cm. along the length of the porous wall, and with the screw conveyor having a length to diameter ratio above 4:1; maintaining a substantially continuous and unagitated cylindrical layer of filter media comprising fibers derived from the feed stream in an annular space located between the inner surface of the porous wall of the cylindrical chamber and the helical outer edge of the screw conveyor, and simultaneously transferring the organic waste located between the grooves of the helical blade of the screw conveyor and surrounded by said cylindrical layer of filter media from the first end of the dewatering zone to the second end of the dewatering zone; withdrawing water radially from the dewatering zone through the porous wall and through said cylindrical layer of filter media; and withdrawing a dewatering zone solids effluent stream having a higher organic waste solids content than the feed stream from the second end of the dewatering zone.

The subject process has been performed continuously for several hours with no detectable clogging of the porous cylindrical wall or degradation in overall performance. It is capable of achieving an extremely high water rejection. The subject process therefore appears to be an improvement over the prior art and fulfills the objectives set for the invention.

The subject process is in fact so effective at dewatering sewage sludge that it may be carried to virtually any practically desirable degree of dryness. As described in my prior application Ser. No. 813,577, the consistency of the sewage sludge changes from a free flowing mud at 20 wt.% solids to a crumbly rubbery mass at about 40–45 wt.% solids. To date this change in consistency and flow characteristics has limited the maximum solids content of the output of a single stage dewatering unit to about 40–45 wt.%. This limitation is believed to be the result of the inability of the screw conveyor to generate a high pressure in the feed or inlet portion of the dewatering zone because of the soupy consistency of the feed sewage sludge. In my prior application, this problem is overcome by admixing dry solids into the feed sludge and thickening it.

It has now been found that by performing two or more separate dewatering zone passes, the previously required solids recycle can be eliminated and very high solids content can be achieved. For instance, sewage sludge was mechanically dewatered to a solids content of approximately 94 wt.% in three passes through a dewatering zone containing a one-inch O.D. screw conveyor. The initial step in this three-pass process was to collect a quantity of partially dewatered solid from the dewatering zone and then to stop feeding the undewatered sewage sludge to the dewatering zone. The collected material was then run through the dewatering zone at the same operating conditions as the first pass and the still further dewatered solid was collected. The material collected from the second pass was then fed into the dewatering zone, which was still operated in the same manner as the first pass. The resultant dewatered sewage sludge was at least as dry as is required or desired for the final pelletizing operation in which it may be formed into fertilizer pellets.

This multi-pass dewatering process may be performed in a batch-type system utilizing a single dewatering zone. Alternatively, it may be performed using two or more separate and unattached dewatering zones in series. For instance, the solids stream of two first-stage dewatering zones of uniform size may be passed into a single third dewatering zone which is also of the same design and is operated at the same conditions as the first two dewatering zones. Preferably, these two first-stage dewatering zones produce dewatering zone solids streams having substantially the same solids content. The dewatering zone solid streams are physically discharged from their cylindrical dewatering zones before their admixture, which preferably is performed at or near ambient atmospheric pressure.

The operation of a dewatering zone may be adjusted to regulate the solids content of the solids stream by varying the pressure imposed within the dewatering zone. This adjustment is performed by changing the total available cross-sectional area of the opening or openings at the outlet of the dewatering zone. The cross-sectional area may be automatically varied based on several measurable parameters such as the determined solids content of the solids stream, the pressure within the dewatering zone, or the torque on the shaft of the screw conveyor. A preferred control method for the process comprises metering the rate at which undewatered solid waste is charged into the dewatering zone and the rate at which water is rejected from the dewatering zone and passing signals representative of these two flow rates to an automatic controller. This controller is programmed with the solids content of the undewatered sewage sludge, which with proper care should not fluctuate over short time periods, and with the desired water rejection rate. By comparison of the measured water rejection rate to the desired rate, a suitable control signal may be generated. This signal is then transmitted to an adjusting means which varies the available cross-sectional area of the discharge opening at the second end of the dewatering zone. The restriction required at the discharge end of the dewatering zone may be quite minimal, and in some cases, no restriction may be required.

I claim as my invention:

1. A process for dewatering fibrous organic waste which comprises the steps of:

(a) passing a feed stream comprising organic waste and which comprises at least 50 wt.% water and at least 5 wt.% fibers on a dry basis into a first end of a first dewatering zone comprising a cylindrical chamber having a cylindrical porous wall formed by parallel windings which are spaced apart by a distance of about 0.0075 to about 0.013 cm.;

(b) pressurizing the feed stream within the first dewatering zone to a superatmospheric pressure by rotating a screw conveyor having a helical blade which begins at the first end of the first dewatering zone and which is centrally mounted within the cylindrical chamber while constricting the opening available at a second end of the first dewatering zone to less than the available cross-sectional area of the cylindrical chamber, the blade of the screw conveyor having a helical outer edge which is separated from the inner surface of the porous wall by a distance of from about 0.08 to 5.0 cm. along the length of the porous wall, and with the screw conveyor having a length to diameter ratio above 2:1;

(c) maintaining a substantially continuous and unagitated cylindrical layer of filter media comprising fibers derived from the feed stream in an annular space located between the inner surface of the porous wall of the cylindrical chamber and the helical outer edge of the screw conveyor, and simultaneously transferring the organic waste located between the grooves of the helical blade of the screw conveyor and surrounded by said cylindrical layer of filter media from the first end of the first dewatering zone to the second end of the first dewatering zone;

(d) withdrawing water radially from the first dewatering zone through the porous wall and through said cylindrical layer of filter media; and, (e) withdrawing a first dewatering zone solids stream having a higher organic waste solids content than the feed stream from the second end of the first dewatering zone.

2. The process of claim 1 further characterized in that the outer edge of the screw conveyor is separated from the inner surface of the porous wall by a distance greater than 0.2 cm.

3. The process of claim 2 further characterized in that the outer edge of the screw conveyor is separated from the inner surface of the porous wall by a distance less than 2.0 cm.

4. The process of claim 3 further characterized in that the length to diameter ratio of the screw conveyor is between 4:1 and 20:1 and in that the screw conveyor is rotated at between 10 to 150 rpm.

5. The process of claim 4 further characterized in that the maximum pressure applied to the organic waste within the dewatering zone is less than 500 psig.

6. The process of claim 5 further characterized in that the maximum pressure applied to the organic waste within the dewatering zone is less than 100 psig.

7. The process of claim 4 further characterized in that the organic waste comprises sewage sludge.

8. The process of claim 7 further characterized in that the first dewatering zone solids stream comprises over 40 wt.% solids.

9. A process for dewatering fibrous organic waste which comprises the steps of:
(a) passing a feed stream comprising organic waste and which comprises at least 50 wt.% water and at least 5 wt.% fibers on a dry basis into a first end of a dewatering zone comprising a cylindrical chamber having a cylindrical porous wall formed by parallel windings which are spaced apart by a distance of about 0.0075 to about 0.013 cm., the cylindrical chamber having a length to diameter ratio above 4:1 and an inner diameter measured at the inner surface of the parallel windings;

(b) pressurizing the feed stream within the dewatering zone to a pressure greater than that present at the outer surface of the cylindrical porous wall by rotating a screw conveyor having a helical blade which begins at the first end of the dewatering zone and which is centrally mounted within the cylindrical chamber while constricting the opening available at a second end of the dewatering zone to less than the available cross-sectional area of the cylindrical chamber, the screw conveyor having a helical outer edge having an outer diameter which is from about 0.95 to about 0.8 times the inner diameter of the porous wall and is from about 5 to about 25 cm. in diameter, with the screw conveyor having a length to diameter ratio above 4:1;

(c) maintaining a substantially continuous and unagitated cylindrical layer of filter media comprising fibers derived from the feed stream in an annular space located between the inner surface of the porous wall of the cylindrical chamber and the helical outer edge of the screw conveyor, and simultaneously transferring the organic waste located between the grooves of the helical blade of the screw conveyor and surrounded by said cylindrical layer of filter media from the first end of the dewatering zone to the second end of the dewatering zone;

(d) withdrawing water radially from the dewatering zone through the porous wall and through said cylindrical layer of filter media; and, (e) withdrawing a dewatering zone solids stream having a higher organic waste solids content than the feed stream from the second end of the dewatering zone.

10. The process of claim 9 further characterized in that the length to diameter ratio of the screw conveyor is less than 20:1 and in that the screw conveyor is rotated at between 10 and 150 rpm.

11. The process of claim 9 further characterized in that the difference between the inner diameter of the porous wall and the outer diameter of the helical outer edge of the screw conveyor is between 0.2 and 2.0 cm. at all points along the length of the dewatering zone.

12. The process of claim 11 further characterized in that the organic waste comprises sewage sludge.

13. The process of claim 12 further characterized in that the dewatering zone solids stream comprises over 40 wt.% solids.

* * * * *